US012718463B2

(12) United States Patent
Wu et al.

(10) Patent No.: US 12,718,463 B2
(45) Date of Patent: Aug. 25, 2026

(54) TEXTURE MAPPING METHOD AND APPARATUS, DEVICE AND STORAGE MEDIUM

(71) Applicant: Beijing Zitiao Network Technology Co., Ltd., Beijing (CN)

(72) Inventors: Jinyuan Wu, Beijing (CN); Jinyuan Wu, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 227 days.

(21) Appl. No.: 18/569,080

(22) PCT Filed: Aug. 8, 2022

(86) PCT No.: PCT/CN2022/110797

§ 371 (c)(1),
(2) Date: Dec. 11, 2023

(87) PCT Pub. No.: WO2023/029893

PCT Pub. Date: Mar. 9, 2023

(65) Prior Publication Data

US 2024/0273808 A1 Aug. 15, 2024

(30) Foreign Application Priority Data

Aug. 31, 2021 (CN) ........................ 202111013556.0

(51) Int. Cl.
*G06T 15/04* (2011.01)

(52) U.S. Cl.
CPC .................................. *G06T 15/04* (2013.01)

(58) Field of Classification Search
CPC .......... G06T 15/04; G06T 11/001; G06T 7/40
See application file for complete search history.

(56) References Cited

U.S. PATENT DOCUMENTS 5,687,307 A 11/1997 Akisada et al.
5,990,900 A 11/1999 Seago
(Continued)

FOREIGN PATENT DOCUMENTS

CN 101006471 A 7/2007
CN 102301399 A 12/2011
(Continued)

OTHER PUBLICATIONS

Yinfei et al., "Realistic Texture Mapping Using Vector Operation for Image Synthesis", Journal of Computer Aided Design and Computer Graphics, vol. 17, No. 2, Feb. 20, 2005, 8 pages, with English Abstract.

(Continued)

*Primary Examiner* — Antonio A Caschera
(74) *Attorney, Agent, or Firm* — Astute IP Law Group

(57) ABSTRACT

A texture mapping method for obtaining three-dimensional coordinates and a normal direction of a fragment of a three-dimensional grid; determining sampling coordinates based on the three-dimensional coordinates and the normal direction of the fragment; performing a sampling on a preset texture image based on the sampling coordinates; and mapping an image obtained by the sampling to the fragment based on an association relationship between the sampling coordinates and the fragment.

16 Claims, 6 Drawing Sheets

(56) References Cited

U.S. PATENT DOCUMENTS

| | | | | |
|---|---|---|---|---|
| 6,999,093 | B1 | 2/2006 | Wetzel et al. | |
| 2003/0080961 | A1* | 5/2003 | Blaho | G06T 15/04 345/426 |
| 2017/0148206 | A1 | 5/2017 | Donner et al. | |
| 2018/0101966 | A1 | 4/2018 | Lee et al. | |
| 2021/0118216 | A1 | 4/2021 | Komissarov et al. | |
| 2021/0134056 | A1 | 5/2021 | He | |

FOREIGN PATENT DOCUMENTS

| | | | |
|---|---|---|---|
| CN | 106683165 | A | 5/2017 |
| CN | 107958480 | A | 4/2018 |
| CN | 108470369 | A | 8/2018 |
| CN | 108876886 | A | 11/2018 |
| CN | 108876921 | A | 11/2018 |
| CN | 109410302 | A | 3/2019 |
| CN | 110111262 | A | 8/2019 |
| CN | 111063017 | A | 4/2020 |
| CN | 111476861 | A | 7/2020 |
| CN | 111508052 | A | 8/2020 |
| CN | 111681307 | A | 9/2020 |
| CN | 112102480 | A | 12/2020 |
| CN | 112288848 | A | 1/2021 |
| CN | 112802172 | A | 5/2021 |
| CN | 113144614 | A | 7/2021 |
| CN | 115733938 | B | 2/2025 |
| JP | H10-283487 | A | 10/1998 |
| WO | 2020182880 | A1 | 9/2020 |

OTHER PUBLICATIONS

International Search Report and Written Opinion for PCT Application No. PCT/CN2022/110796, mailed Nov. 11, 2022, 14 Pages.

International Search Report and Written Opinion for PCT Application No. PCT/CN2022/110797, mailed Nov. 8, 2022, 9 Pages.

Office Action for Chinese Application No. 202111016296.2, mailed Jan. 5, 2024, 12 Pages.

Office Action for Chinese Patent Application No. 202111013556.0, mailed on Apr. 17, 2026, 14 pages.

* cited by examiner

TEXTURE MAPPING METHOD AND APPARATUS, DEVICE AND STORAGE MEDIUM

CROSS REFERENCE TO RELATED APPLICATION

This application is a national phase of International Patent Application No. PCT/CN2022/110797, filed on Aug. 8, 2022, which claims the priority of Chinese Patent Application No. 202111013556.0, filed on Aug. 31, 2021. All the aforementioned patent applications are hereby incorporated by reference in their entireties.

TECHNICAL FIELD

Embodiments of the present disclosure relate to the technical field of image processing, and in particular, to a texture mapping method and apparatus, a device, and a storage medium.

BACKGROUND

Video applications provided by related technologies are capable of shooting videos of real scenes and sharing the videos of the real scenes on video consumption platforms for viewing by the users. However, with the development of the video applications, the share of real scenes has been unable to meet increasing user requirements. Therefore, how to add a texture image with a special effect to a video scene for improving the interestingness of the video is a technical problem urgently needing to be solved at present.

SUMMARY

To solve or solve at least in part the above-mentioned technical problems, the embodiments of the present disclosure provide a texture mapping method and apparatus, a device, and a storage medium.

In a first aspect of the embodiments of the present disclosure, a texture mapping method is provided, which includes:

- obtaining three-dimensional coordinates and a normal direction of a fragment of a three-dimensional grid;
- determining sampling coordinates based on the three-dimensional coordinates and the normal direction of the fragment;
- performing a sampling on a preset texture image based on the sampling coordinates; and
- mapping an image obtained by the sampling to the fragment based on an association relationship between the sampling coordinates and the fragment.

In a second aspect of the embodiments of the present disclosure, a texture mapping apparatus is provided, which includes:

- an obtaining module configured to obtain three-dimensional coordinates and a normal direction of a fragment of a three-dimensional grid;
- a determining module configured to determine sampling coordinates based on the three-dimensional coordinates and the normal direction of the fragment;
- a sampling module configured to perform a sampling on a preset texture image based on the sampling coordinates; and
- a texture mapping module configured to map an image obtained by the sampling to the fragment based on an association relationship between the sampling coordinates and the fragment.

In a third aspect of the embodiments of the present disclosure, an electronic device is provided, which includes a memory and a processor, wherein a computer program is stored in the memory, and, wherein the computer program, when executed by the processor, implements the texture mapping method according to the first aspect.

In a fourth aspect of the embodiments of the present disclosure, a computer-readable storage medium is provided, in which, a computer program is stored in the storage medium, wherein the computer program, when executed by a processor, implements the texture mapping method according to the first aspect.

In a fifth aspect of the embodiments of the present disclosure, a computer program product is provided, which includes a computer program carried on a non-transitory computer-readable storage medium, wherein the computer program includes a program code for implementing the texture mapping method according to the first aspect.

BRIEF DESCRIPTION OF THE DRAWINGS

The accompanying drawings here are incorporated into the specification and form a part of this specification, showing embodiments that comply with the present disclosure, and are used together with the specification to explain the principles of the present disclosure.

In order to provide a clearer explanation of the disclosed embodiments or technical solutions in the prior art, a brief introduction will be given to the accompanying drawings required in the embodiments or description of the prior art. It is evident that for ordinary technical personnel in the art, other accompanying drawings can be obtained based on these drawings without any creative effort.

DETAILED DESCRIPTION

In order to better understand the above objectives, features, and advantages of the present disclosure, the following will further describe the disclosed scheme. It should be noted that in the absence of conflict, the embodiments disclosed herein and the features in the embodiments can be combined with each other.

Many specific details have been elaborated in the following description to facilitate a full understanding of the present disclosure; however, the present disclosure can also be implemented in other ways different from those described herein. Obviously, the embodiments in the specification are only a portion of the embodiments disclosed in this disclosure, rather than all of them.

In related technologies, video applications are capable of shooting videos of real scenes and sharing the videos of the real scenes on video consumption platforms for consumers to view.

With the development of the video applications, the share of real scenes has been unable to meet increasing user requirements. It is desirable for a user to add a texture image with a special effect to a video scene to improve the interestingness of the video for meeting the increasing user requirements.

To add a texture image with a special effect to a video scene, the embodiments of the present disclosure provides a texture mapping method and apparatus, a device, and a storage medium, that allows for determination of sampling coordinates based on the three-dimensional coordinates and the normal direction of a fragment of a three-dimensional grid, sampling of a preset texture image based on the sampling coordinates, and mapping of an image obtained by the sampling to the fragment, such that the texture image, which are captured based on the sampling coordinates, after being mapped to a three-dimensional scene of a video, can fit the three-dimensional scene of the video, and a natural and realistic effect can be presented, and thus, the interestingness of the video can be improved.

The texture mapping method provided in the embodiments of the present disclosure is described below first with reference to FIG. 1 to FIG. 4.

Figure 1:
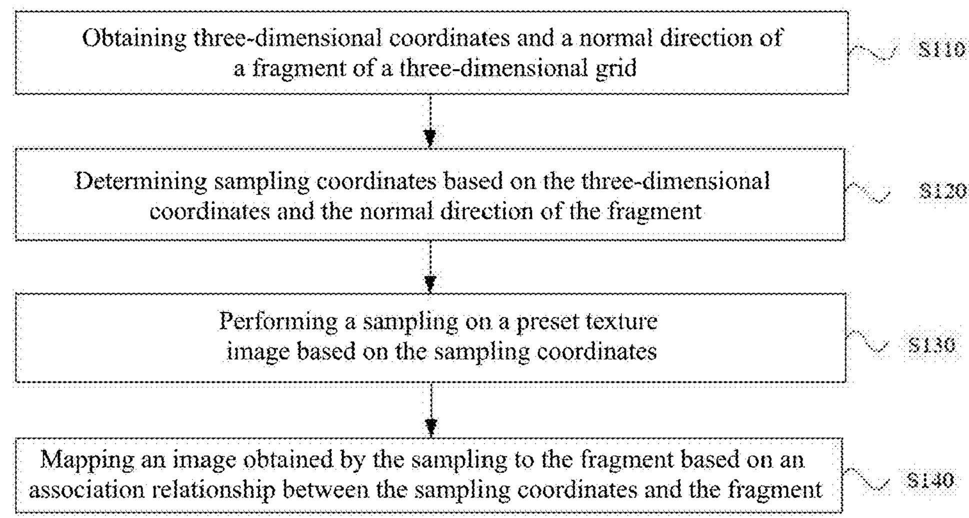
FIG. 1 is a flowchart of a texture mapping method provided in embodiments of the present disclosure.

FIG. 1 illustrates a flowchart of a texture mapping method provided in embodiments of the present disclosure.

In some embodiments of the present disclosure, the texture mapping method shown in FIG. 1 may be performed by an electronic device. The electronic device may include devices with texture mapping function, such as a mobile phone, a Pad, a desktop computer, a laptop, a vehicle-mounted terminal, a wearable device, an all-in-one machine, and a smart home device, and may also include a virtual machine or a device simulated by a simulator.

As shown in FIG. 1, the texture mapping method may include the following steps S110 to S140.

S110, three-dimensional coordinates and a normal direction of a fragment of a three-dimensional grid are obtained.

Specifically, before obtaining the three-dimensional coordinates and the normal direction of the fragment of the three-dimensional grid, a shooting device may be utilized to capture a scene needing to be added with a special effect from a different angle respectively, to obtain a scene image of the scene. The scene image is transmitted to the electronic device. After obtaining the scene image, the electronic device performs scene reconstruction on the scene image to obtain three-dimensional reconstruction data of the scene. The three-dimensional reconstruction data includes data of three-dimensional grids forming a three-dimensional scene model, and the data of the three-dimensional grid includes vertex coordinates and a normal direction.

In an implementation, the shooting device may include devices such as a three-dimensional scanner, a camera, a laser device, and a depth camera. The shooting device may reside on the electronic device or may be independently, which will not be limited here.

In the embodiments of the present disclosure, the three-dimensional grid may be construed as a basic unit forming a three-dimensional model.

The fragment is a minimum unit obtained by proportionally segmenting the three-dimensional grid.

In an exemplary implementation of the embodiments of the present disclosure, vertex three-dimensional coordinates and the normal direction of the three-dimensional grid may be extracted from the three-dimensional reconstruction data of the scene by a vertex shader.

In another exemplary implementation of the embodiments of the present disclosure, vertex coordinates and a normal direction of the three-dimensional grid may be processed by a fragment shader to obtain the three-dimensional coordinates and the normal direction of the fragment of the three-dimensional grid.

S120, sampling coordinates are determined based on the three-dimensional coordinates and the normal direction of the fragment.

In an embodiment of the present disclosure, the sampling coordinates may be used to determine coordinate data of a sampling position. The sampling coordinates may be two-dimensional coordinates of a projection of the fragment on a certain coordinate plane.

In one example of the embodiments of the present disclosure, firstly, distance relationships between a normal of the fragment and three coordinate axes of a preset three-dimensional coordinate system may be determined based on the three-dimensional coordinates and the normal direction of the fragment; and in response to that a distance between the normal and a first coordinate axis of the three coordinate axes is the shortest, the sampling coordinates are determined based on components of the three-dimensional coordinates on a second coordinate axis and a third coordinate axis of the three coordinate axes. Alternatively, after the distance relationships between the normal of the fragment and the three coordinate axes of the preset three-dimensional coordinate system are determined, when distances of the normal from the first coordinate axis and the second coordinate axis are the same and smaller than a distance of the normal from the third coordinate axis, i.e., when the distances of the normal from the first coordinate axis and the second coordinate axis are the shortest, the sampling coordinates are determined based on the components of the three-dimensional coordinates on the second coordinate axis and the third coordinate axis or components of the three-dimensional coordinates on the first coordinate axis and the third coordinate axis.

Figure 7:
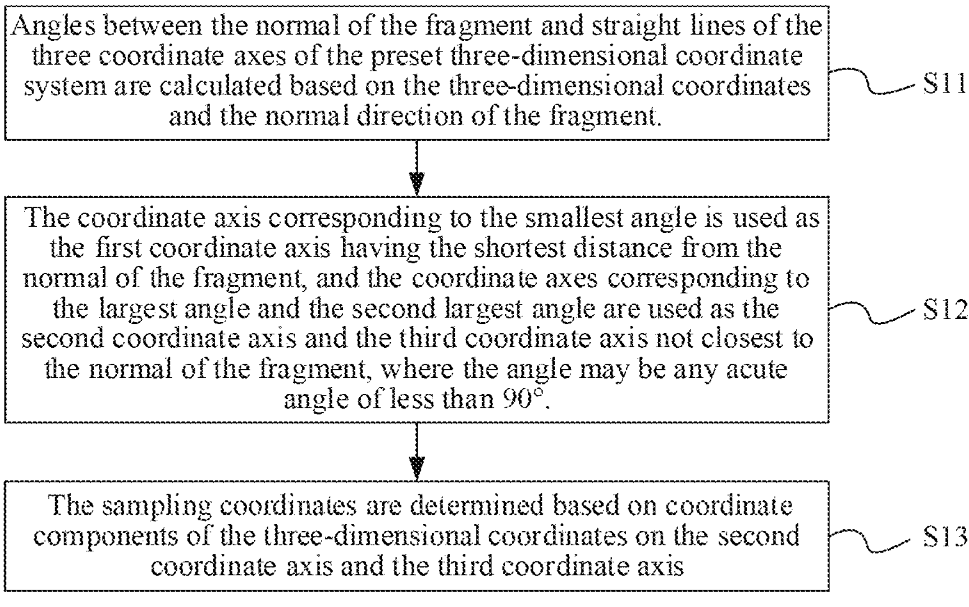
FIG. 7 is a flowchart of determining sampling coordinates provided in embodiments of the present disclosure.

For example, in one example of the embodiments of the present disclosure, the sampling coordinates may be determined by the following steps S11 to S13 as shown in FIG. 7.

S11, angles between the normal of the fragment and straight lines of the three coordinate axes of the preset three-dimensional coordinate system are calculated based on the three-dimensional coordinates and the normal direction of the fragment.

S12, the coordinate axis corresponding to the smallest angle is used as the first coordinate axis having the shortest distance from the normal of the fragment, and the coordinate axes corresponding to the largest angle and the second largest angle are used as the second coordinate axis and the third coordinate axis not closest to the normal of the fragment, where the angle may be any acute angle of less than 90°.

S13, the sampling coordinates are determined based on coordinate components of the three-dimensional coordinates on the second coordinate axis and the third coordinate axis.

The preset three-dimensional coordinate system may be a three-dimensional coordinate system used by a three-dimensional grid model to which the fragment belongs.

Figure 8:
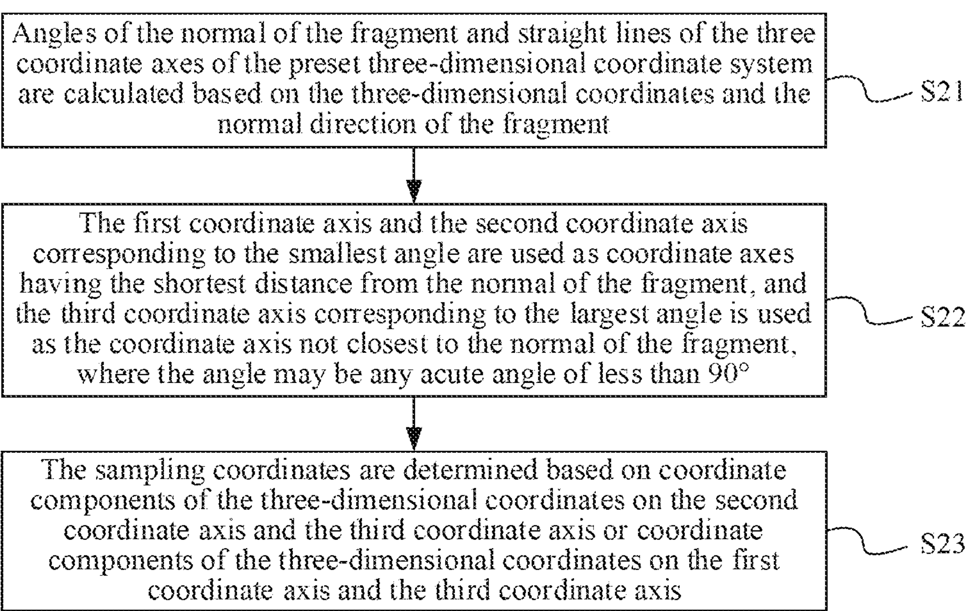
FIG. 8 is another flowchart of determining sampling coordinates provided in embodiments of the present disclosure.

For example, in another example of the embodiments of the present disclosure, the sampling coordinates may also be determined by the following steps S21 to S23 as shown in FIG. 8.

S21, angles of the normal of the fragment and straight lines of the three coordinate axes of the preset three-dimensional coordinate system are calculated based on the three-dimensional coordinates and the normal direction of the fragment.

S22, the first coordinate axis and the second coordinate axis corresponding to the smallest angle are used as coordinate axes having the shortest distance from the normal of the fragment, and the third coordinate axis corresponding to the largest angle is used as the coordinate axis not closest to the normal of the fragment, where the angle may be any acute angle of less than 90°.

The first coordinate axis and the second coordinate axis corresponding to the smallest angle refer to that the angles between the normal and the first and second coordinate axes are the same and smaller than the angle between the normal and the third coordinate axis.

S23, the sampling coordinates are determined based on coordinate components of the three-dimensional coordinates on the second coordinate axis and the third coordinate axis or coordinate components of the three-dimensional coordinates on the first coordinate axis and the third coordinate axis.

In the embodiments of the present disclosure, the three-dimensional coordinates and the normal direction of the fragment are taken into account when determining the sampling coordinates, and a texture image captured based on the sampling coordinates may fit a three-dimensional scene of a video after being mapped to the three-dimensional scene of the video, and thus, a natural and realistic effect can be presented.

S130, performing a sampling on a preset texture image based on the sampling coordinates.

In an embodiment of the present disclosure, the preset texture image may be a texture image to be sampled.

The preset texture image may be an image to be mapped, which is a two-dimensional plane image, and the position of each pixel and texture information of the pixel at each position are defined in the preset texture image.

In an implementation, the preset texture image may also be a text image, a landscape image, a building image, or other type of images, which will not be limited here.

Specifically, after determining the sampling coordinates, the electronic device may sample, based on the sampling coordinates, the texture information of a pixel at a position corresponding to the sampling coordinates on the texture image to obtain a corresponding texture.

Figure 2:
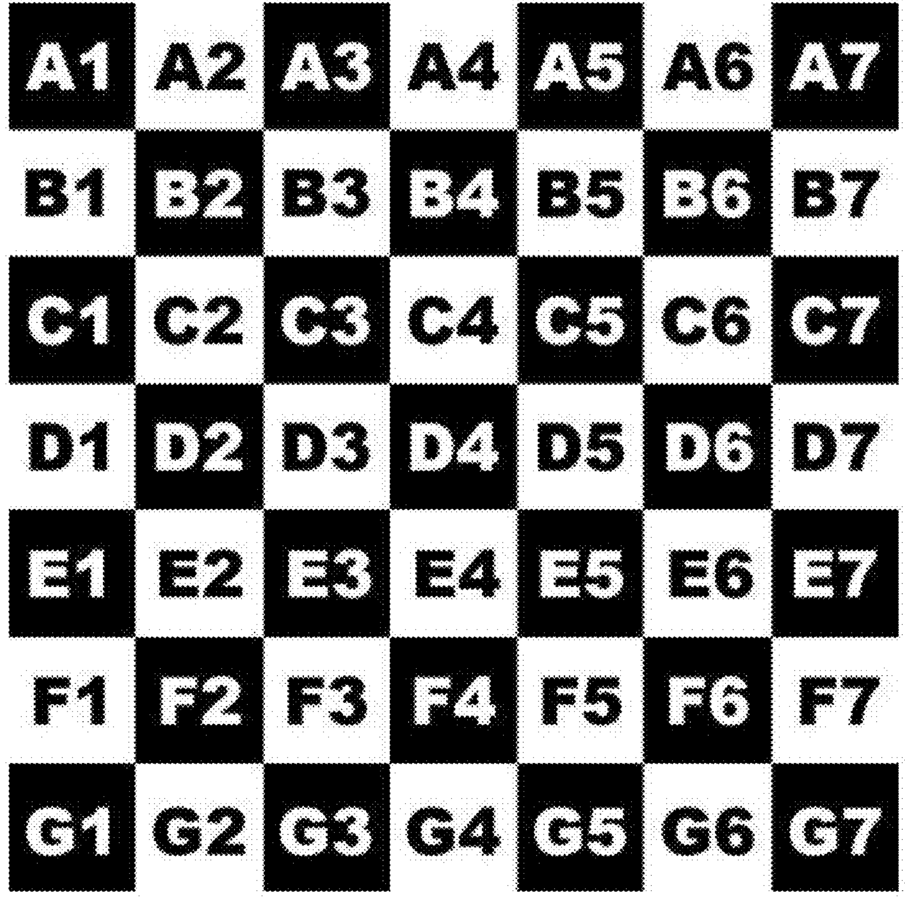
FIG. 2 is a schematic diagram of a preset texture image provided in embodiments of the present disclosure.

FIG. 2 illustrates a schematic diagram of a preset texture image provided in embodiments of the present disclosure.

As shown in FIG. 2, the preset texture image may be a text image.

Taking the texture information collected at positions A1, A3, and A5 in FIG. 2 as an example, assuming that the three sampling coordinates determined correspond to the positions of A1, A3, and A5 respectively, the electronic device may, based on the sampling coordinates, textures of pixels at the positions corresponding to the sampling coordinates on the texture image, i.e., sample the textures of the pixels at A1, A3, and A5, to obtain textures at A1, A3, and A5.

S140, an image obtained by the sampling is mapped to the fragment based on an association relationship between the sampling coordinates and the fragment.

In an embodiment of the present disclosure, the texture mapping may be construed as a process of mapping a texture on a texture image to a three-dimensional model of a scene.

It will be understood that each fragment corresponds to a unique set of three-dimensional coordinates, and the sampling coordinates may be construed as two-dimensional coordinates of a projection of the three-dimensional coordinates of the fragment on a certain coordinate plane in the three-dimensional coordinate system.

Specifically, since the sampling coordinates are determined based on the three-dimensional coordinates and the normal direction of the fragment, after the texture image is obtained by the sampling based on the sampling coordinates, the texture image obtained by the sampling may be mapped to the fragment based on the association relationship between the sampling coordinates and the fragment.

In an implementation, the texture information obtained by sampling the preset texture image may be mapped to the fragment in a tri-planar mapping manner or a common mapping manner. That is, the texture image is mapped to the three-dimensional model of the scene.

Figure 3:
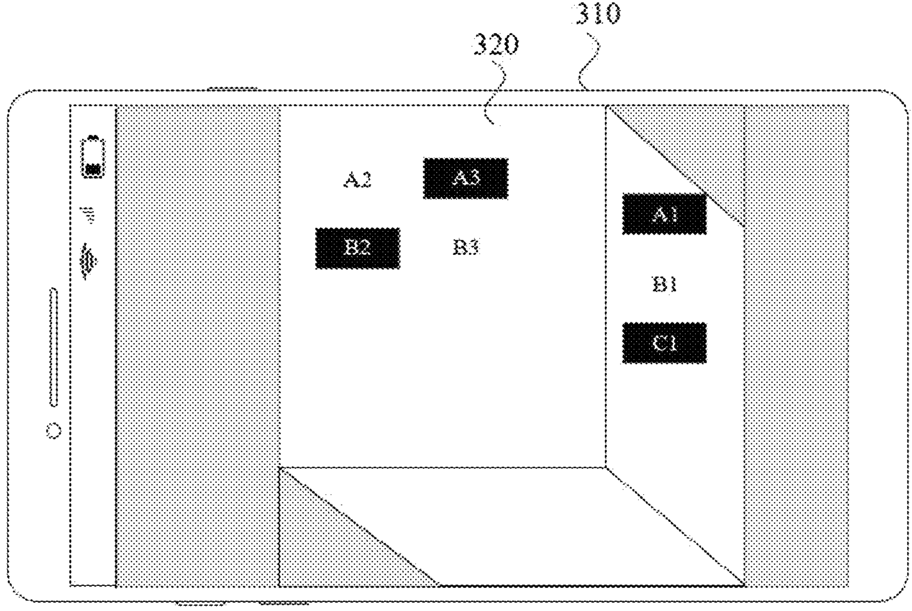
FIG. 3 is a diagram illustrating a presentation effect of a scene provided in embodiments of the present disclosure.

FIG. 3 is a diagram illustrating a presentation effect of a scene provided in embodiments of the present disclosure.

As shown in FIG. 3, a scene image 320 is an image obtained by the electronic device 310. Textures at positions A1, B1, C1, A2, B2, A3, and B3 in the texture image shown in FIG. 2 are sampled, and thus the texture mapping effect shown in FIG. 3 can be achieved. As shown in FIG. 3, after the textures are mapped to the scene image according to the texture mapping method in the embodiment of the present disclosure, the textures are enabled to fit the three-dimensional scene in the scene image, and a natural and realistic effect can be presented, and thus, the interestingness of the video can be improved.

According to the embodiments of the present disclosure, the three-dimensional coordinates and the normal direction of a fragment of a three-dimensional grid can be obtained; sampling coordinates can be determined based on the three-dimensional coordinates and the normal direction of the fragment; a preset texture image can be sampled based on the sampling coordinates; and an image obtained by the sampling can be mapped to the fragment based on an association relationship between the sampling coordinates and the fragment. In the embodiments of the present disclosure, since the three-dimensional coordinates and the normal direction of the fragment are taken into account when determining the sampling coordinates, the texture image, which are captured based on the sampling coordinates, after being mapped to a three-dimensional scene of a video, can fit the three-dimensional scene of the video, and a natural and realistic effect can be presented, and thus, the interestingness of the video can be improved.

Figure 9:
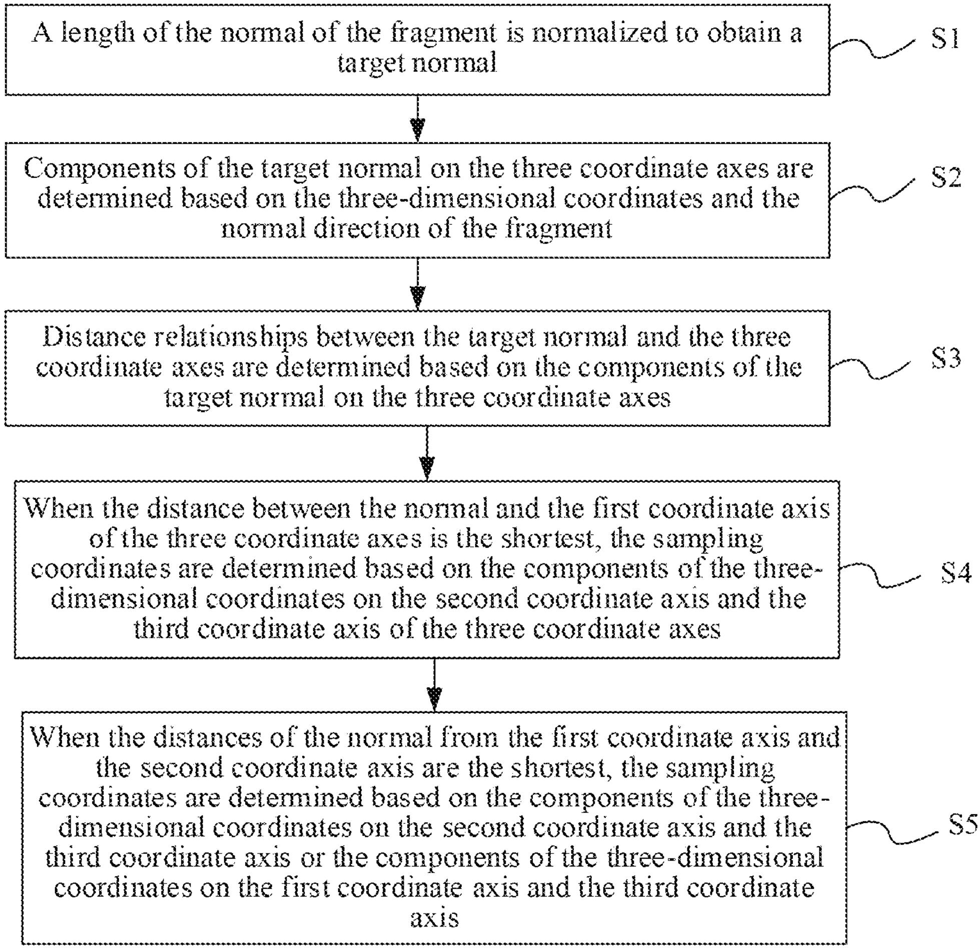
FIG. 9 is a flowchart of determining distance relationships between the normal of the fragment and the three coordinate axes of the preset three-dimensional coordinate system provided in embodiments of the present disclosure.

In one example of the embodiments of the present disclosure, determining the distance relationships between the normal of the fragment and the three coordinate axes of the preset three-dimensional coordinate system based on the three-dimensional coordinates and the normal direction of the fragment may include the following step S1 to S3 as shown in FIG. 9.

S1, a length of the normal of the fragment is normalized to obtain a target normal.

S2, components of the target normal on the three coordinate axes are determined based on the three-dimensional coordinates and the normal direction of the fragment.

S3, distance relationships between the target normal and the three coordinate axes are determined based on the components of the target normal on the three coordinate axes.

Distances of the target normal from the coordinate axes are inversely proportional to the components of the target normal on the coordinate axes.

A normalization coefficient for the lengths of the normals of fragments may be preset to normalize the lengths of the normals into a same length. In an implementation, the length of the normal may be any one of values such as 1, 2, and 3, which will not be limited here.

The components of the target normal on the three coordinate axes may be projection lengths of the target normal on the three coordinate axes.

The distance relationships may be used to characterize degrees of proximity of the normal to the first coordinate axis, the second coordinate axis, and the third coordinate axis.

It will be understood that the larger the components of the target normal on the three coordinate axes, the greater the projection lengths of the target normal on the three coordinate axes and the smaller the distances of the target normal from the three coordinate axes, and therefore, the target normal is closer to the three coordinate axes. Conversely, the smaller the components of the target normal on the three coordinate axes, the smaller the projection lengths of the target normal on the three coordinate axes and the greater the distances of the target normal from the three coordinate axes, and therefore, the target normal is farther away from the three coordinate axes.

Thus, in the embodiments of the present disclosure, the components of the target normal on the three coordinate axes may be determined based on the three-dimensional coordinates of the fragment and the target normal after the normalization, i.e., the distance relationships between the target normal and the three coordinate axes are determined to further determine the sampling coordinates according to the distance relationships.

In some embodiments, the texture mapping method may further include step S4 as shown in FIG. 9 after step S3 described above.

S4, when the distance between the normal and the first coordinate axis of the three coordinate axes is the shortest, the sampling coordinates are determined based on the components of the three-dimensional coordinates on the second coordinate axis and the third coordinate axis of the three coordinate axes.

The components of the three-dimensional coordinates on the second coordinate axis and the third coordinate axis of the three coordinate axes may be construed as coordinates of the three-dimensional coordinates on the second coordinate axis and the third coordinate axis of the three coordinate axes.

Taking for example that the first coordinate axis is X-axis, the second coordinate axis is Y-axis, the third coordinate axis is Z-axis, and the length of the normal of the fragment is 1, after normalizing the length of the normal of the fragment to obtain the target normal, the electronic device projects the target normal on the three coordinate axes to obtain the components of the target normal on the three coordinate axes, determines that the first coordinate axis (X-axis) is closest to the normal based on the magnitudes of the components of the target normal on the three coordinate axes, and with the first coordinate axis (X-axis) as the coordinate axis closest to the normal, the sampling coordinates $(y_n, z_n)$ are determined based on coordinates of the three-dimensional coordinates on the second coordinate axis (Y-axis) and the third coordinate axis (Z-axis) to acquire the textures in the preset texture image based on the sampling coordinates $(y_n, z_n)$.

In some other embodiments, the texture mapping method may further include step S5 as shown in FIG. 9 after step S3 described above.

S5, when the distances of the normal from the first coordinate axis and the second coordinate axis are the shortest, the sampling coordinates are determined based on the components of the three-dimensional coordinates on the second coordinate axis and the third coordinate axis or the components of the three-dimensional coordinates on the first coordinate axis and the third coordinate axis.

Also taking for example that the first coordinate axis is X-axis, the second coordinate axis is Y-axis, the third coordinate axis is Z-axis, and the length of the normal of the fragment is 1, after normalizing the length of the normal of the fragment to obtain the target normal, the electronic device projects the target normal on the three coordinate axes to obtain the components of the target normal on the three coordinate axes, determines that the first coordinate axis (X-axis) and the second coordinate axis (Y-axis) are closest to the normal based on the magnitudes of the components of the target normal on the three coordinate axes, and with the first coordinate axis (X-axis) and the second coordinate axis (Y-axis) as the coordinate axes closest to the normal, the sampling coordinates $(y_n, z_n)$ are determined based on the coordinates of the three-dimensional coordinates on the second coordinate axis (Y-axis) and the third coordinate axis (Z-axis), or the sampling coordinates $(x_n, z_n)$ are determined based on the coordinates of the three-dimensional coordinates on the first coordinate axis (X-axis) and the third coordinate axis (Z-axis), to acquire color information in the preset texture image based on the sampling coordinates $(x_n, z_n)$ or the sampling coordinates $(y_n, z_n)$.

To sum up, in the embodiments of the present disclosure, when determining the sampling coordinates, the three-dimensional coordinates of the fragment and the target normal after the normalization are taken into account. Thus, after the sampling coordinates are obtained, a texture image captured based on the sampling coordinates can be enabled to fit a three-dimensional scene of a video after being mapped to the three-dimensional scene of the video, and a natural and realistic effect can be presented.

In further another implementation of the present disclosure, three-dimensional reconstruction may be performed on the obtained scene image to obtain three-dimensional reconstruction data, and the three-dimensional coordinates and the normal direction of the fragment can be determined accurately by using a vertex shader, a fragment shader, and the three-dimensional reconstruction data in sequence.

Figure 4:
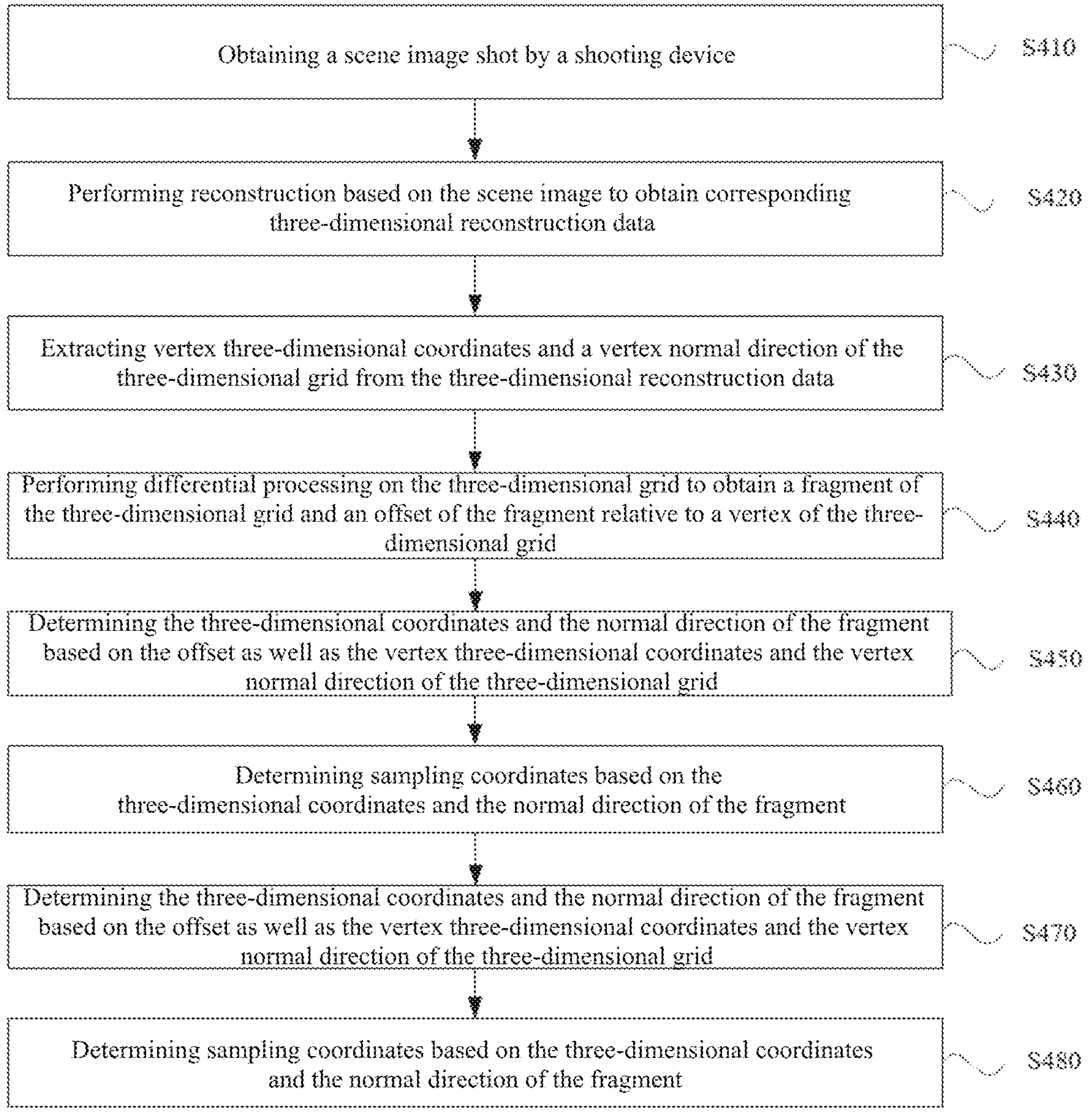
FIG. 4 is another flowchart of texture mapping method provided in embodiments of the present disclosure.

FIG. 4 illustrates another flowchart of texture mapping method provided in embodiments of the present disclosure.

As shown in FIG. 4, the texture mapping method may include the following steps S410 to S480.

S410, a scene image shot by a shooting device is obtained.

In an embodiment of the present disclosure, the shooting device is the same as the shooting device described in the foregoing embodiments.

In an implementation, the shooting device may be a device such as a three-dimensional scanner, a camera, a laser device, and a depth camera, which will not be limited here.

In an embodiment of the present disclosure, the scene image may be an image obtained by shooting a scene needing to be added with a special effect.

In an implementation, the scene image may be a three-dimensional image, a two-dimensional image, a depth image, or the like, which will not be limited here.

S420, reconstruction is performed based on the scene image to obtain corresponding three-dimensional reconstruction data.

Specifically, after obtaining the scene image, the electronic device may perform scene reconstruction on the scene image to obtain the three-dimensional reconstruction data of the scene.

S430, vertex three-dimensional coordinates and a vertex normal direction of the three-dimensional grid are extracted from the three-dimensional reconstruction data.

In an embodiment of the present disclosure, the three-dimensional reconstruction data includes the data of three-dimensional grid forming a three-dimensional scene model, and the data of the three-dimensional grid includes vertex coordinates and a normal direction.

Specifically, the electronic device may extract the vertex coordinates and the normal direction of the three-dimensional grid from the three-dimensional reconstruction data of the scene by a vertex shader.

S440, differential processing is performed on the three-dimensional grid to obtain a fragment of the three-dimensional grid and an offset of the fragment relative to a vertex of the three-dimensional grid.

In an embodiment of the present disclosure, the differential processing may be discretizing the three-dimensional grid according to a preset stride based on the vertex of the three-dimensional grid and by using an interpolation function, such that the three-dimensional grid is discretized into a plurality of fragments.

The offset of the fragment relative to a vertex of the three-dimensional grid may be a stride of the fragment relative to the vertex of the three-dimensional grid.

Specifically, after extracting the vertex three-dimensional coordinates and the vertex normal direction of the three-dimensional grid from the three-dimensional reconstruction data, the electronic device may input the extracted vertex three-dimensional coordinates and vertex normal direction of the three-dimensional grid to a fragment shader. The fragment shader may discretize, based on a finite difference method, the three-dimensional grid according to the preset stride based on the vertex of the three-dimensional grid and by using the interpolation function, such that the three-dimensional grid is discretized into one or more fragments, thereby obtaining the fragment(s) of the three-dimensional grid and the offset(s) of the fragment(s) relative to the vertex of the three-dimensional grid.

S450, the three-dimensional coordinates and the normal direction of the fragment are determined based on the offset as well as the vertex three-dimensional coordinates and the vertex normal direction of the three-dimensional grid.

In an embodiment of the present disclosure, S450 may include: for each fragment, calculating the three-dimensional coordinates of each fragment based on the vertex three-dimensional coordinates of the three-dimensional grid and the offset of each fragment relative to the vertex of the three-dimensional grid; and constructing the normal of each fragment based on the three-dimensional coordinates of the fragment, and using the vertex normal direction as the normal direction of each fragment.

Specifically, after obtaining the fragment of the three-dimensional grid and the offset of the fragment relative to the vertex of the three-dimensional grid, the electronic device may further utilize the fragment shader to, for each fragment, calculate the three-dimensional coordinates of each fragment based on the vertex three-dimensional coordinates of the three-dimensional grid and the offset of each fragment relative to the vertex of the three-dimensional grid, and construct the normal of each fragment based on the three-dimensional coordinates of the fragment, and use the vertex normal direction as the normal direction of each fragment.

Thus, in the embodiments of the present disclosure, after the scene image shot by the shooting device is obtained, reconstruction may be performed based on the scene image to obtain the corresponding three-dimensional reconstruction data. The vertex three-dimensional coordinates and the vertex normal direction of the three-dimensional grid are accurately extracted from the three-dimensional reconstruction data by using the vertex shader. Differential processing is then performed on the three-dimensional grid by using the fragment shader to obtain fragments of the three-dimensional grid and offsets of the fragments relative to the vertex of the three-dimensional grid. At last, the three-dimensional coordinates and the normal direction of the fragment are accurately determined based on the offset as well as the vertex three-dimensional coordinates and the vertex normal direction of the three-dimensional grid.

S460, sampling coordinates are determined based on the three-dimensional coordinates and the normal direction of the fragment.

S470, a preset texture image is sampled based on the sampling coordinates.

S480, an image obtained by the sampling is mapped to the fragment based on an association relationship between the sampling coordinates and the fragment.

S460 to S480 are similar to S120 to S140, which will not be repeated here.

Figure 5:
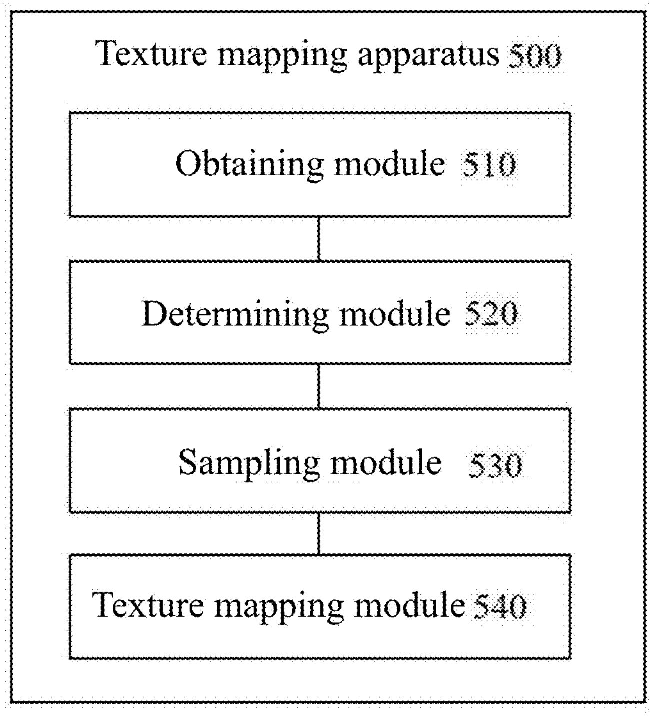
FIG. 5 is a structural schematic diagram of a texture mapping apparatus provided in embodiments of the present disclosure.

FIG. 5 is a structural schematic diagram of a texture mapping apparatus provided in embodiments of the present disclosure. The texture mapping apparatus may be construed as part of functional modules in the electronic device or the texture mapping device described above. As shown in FIG. 5, the texture mapping apparatus 500 may include:

- an obtaining module 510 configured to obtain three-dimensional coordinates and a normal direction of a fragment of a three-dimensional grid;
- a determining module 520 configured to determine sampling coordinates based on the three-dimensional coordinates and the normal direction of the fragment;
- a sampling module 530 configured to perform a sampling on a preset texture image based on the sampling coordinates; and
- a texture mapping module 540 configured to map an image obtained by the sampling to the fragment based on an association relationship between the sampling coordinates and the fragment.

In the embodiments of the present disclosure, the texture mapping apparatus 500 is capable of obtaining the three-dimensional coordinates and the normal direction of a fragment of a three-dimensional grid, determining sampling coordinates based on the three-dimensional coordinates and the normal direction of the fragment, sampling a preset texture image based on the sampling coordinates, and mapping an image obtained by the sampling to the fragment based on an association relationship between the sampling coordinates and the fragment. In the embodiments of the present disclosure, since the three-dimensional coordinates and the normal direction of the fragment are taken into account when determining the sampling coordinates, the texture image, which are captured based on the sampling coordinates, after being mapped to a three-dimensional scene of a video, can fit the three-dimensional scene of the video, and a natural and realistic effect can be presented, and thus, the interestingness of the video can be improved.

In an implementation, the determining module 520 may be specifically configured to: determine, based on the three-dimensional coordinates and the normal direction of the fragment, distance relationships between a normal of the fragment and three coordinate axes of a preset three-dimensional coordinate system; and when a distance between the normal and a first coordinate axis of the three coordinate axes is the shortest, the sampling coordinates are determined based one components of the three-dimensional coordinates on a second coordinate axis and a third coordinate axis of the three coordinate axes.

In an implementation, the determining module 520 may be specifically configured to: normalize a length of the normal of the fragment to obtain a target normal; determine components of the target normal on the three coordinate axes based on the three-dimensional coordinates and the normal direction of the fragment; and determine distance relationships between the target normal and the three coordinate axes based on the components of the target normal on the three coordinate axes, where distances of the target normal from the coordinate axes are inversely proportional to the components of the target normal on the coordinate axes.

In an implementation, the determining module 520 may be further configured to: when distances of the normal from the first coordinate axis and the second coordinate axis are the shortest, the sampling coordinates are determined based on the components of the three-dimensional coordinates on the second coordinate axis and the third coordinate axis or components of the three-dimensional coordinates on the first coordinate axis and the third coordinate axis.

In an implementation, the obtaining module 510 may be specifically configured to: obtain a scene image shot by a shooting device; perform reconstruction based on the scene image to obtain corresponding three-dimensional reconstruction data; extract vertex three-dimensional coordinates and vertex normal directions of the three-dimensional grid from the three-dimensional reconstruction data; perform differential processing on the three-dimensional grid to obtain a fragment of the three-dimensional grid and an offset of the fragment relative to a vertex of the three-dimensional grid; and determine the three-dimensional coordinates and the normal direction of the fragment based on the offset as well as the vertex three-dimensional coordinates and the vertex normal directions of the three-dimensional grid.

The apparatus provided in the present embodiments is capable of performing the method in any of the embodiments of FIG. 1 to FIG. 4 described above, and the implementation manner and the beneficial effects are similar, which will not be repeated here.

An embodiment of the present disclosure further provides an electronic device. The electronic device includes a processor and a memory, where a computer program is stored in the memory, and when executed by the processor, causes implementing the texture mapping method in any of the embodiments shown in FIG. 1 to FIG. 4 described above.

Figure 6:
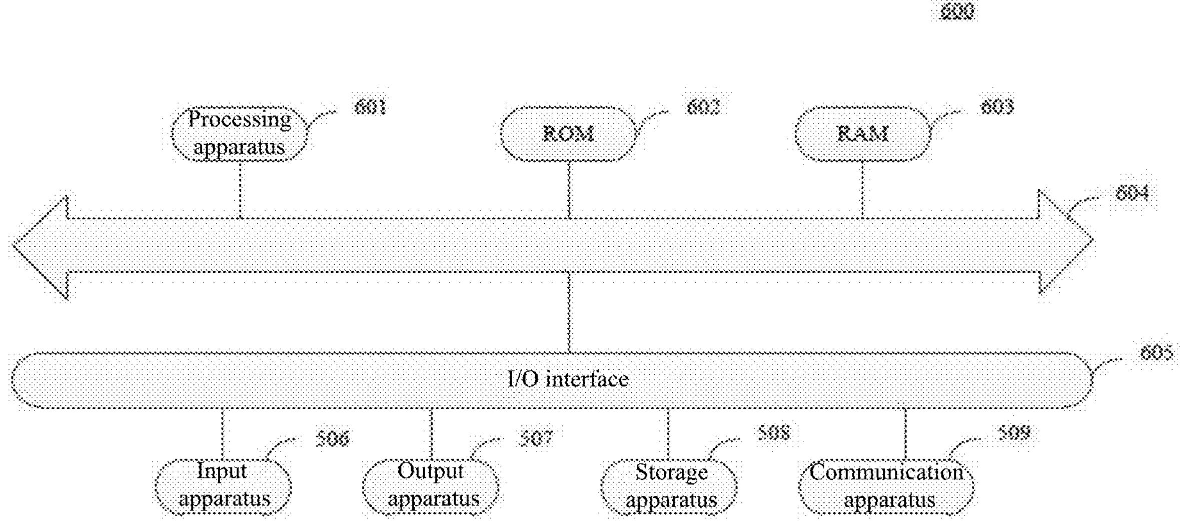
FIG. 6 is a structural schematic diagram of an electronic device provided in embodiments of the present disclosure.

Exemplarily, FIG. 6 is a structural schematic diagram of an electronic device in an embodiment of the present disclosure. The following description is made specifically with reference to FIG. 6 which is a structural schematic diagram of an electronic device 600 adapted to implement the embodiments of the present disclosure. The electronic device 600 in the embodiment of the present disclosure may include but not be limited to mobile terminals such as a mobile phone, a notebook computer, a digital broadcasting receiver, a personal digital assistant (PDA), a portable Android device (PAD), a portable media player (PMP), and a vehicle-mounted terminal (e.g., a vehicle-mounted navigation terminal), and fixed terminals such as a digital TV and a desktop computer. The electronic device shown in FIG. 6 is merely an example, and should not pose any limitation to the functions and the range of use of the embodiments of the present disclosure.

As shown in FIG. 6, the electronic device 600 may include a processing apparatus (e.g., a central processing unit, a graphics processing unit) 601, which can perform various suitable actions and processing according to a program stored in a read-only memory (ROM) 602 or a program loaded from a storage apparatus 508 into a random-access memory (RAM) 603. The RAM 603 further stores various programs and data required for operations of the electronic device 600. The processing apparatus 601, the ROM 602, and the RAM 603 are interconnected by means of a bus 604. An input/output (I/O) interface 605 is also connected to the bus 604.

Usually, the following apparatuses may be connected to the I/O interface 605: an input apparatus 506 including, for example, a touch screen, a touch pad, a keyboard, a mouse, a camera, a microphone, an accelerometer, and a gyroscope; an output apparatus 507 including, for example, a liquid crystal display (LCD), a loudspeaker, and a vibrator; a storage apparatus 508 including, for example, a magnetic tape and a hard disk; and a communication apparatus 509. The communication apparatus 509 may allow the electronic device 600 to be in wireless or wired communication with other devices to exchange data. While FIG. 6 illustrates the electronic device 600 having various apparatuses, it is to be understood that all the illustrated apparatuses are not necessarily implemented or included. More or less apparatuses may be implemented or included alternatively.

Particularly, according to the embodiments of the present disclosure, the process described above with reference to the flowchart may be implemented as a computer software program. For example, an embodiment of the present disclosure includes a computer program product, which includes a computer program carried by a non-transitory computer-readable medium. The computer program includes a program code for performing the method shown in the flowchart. In such an embodiment, the computer program may be downloaded online through the communication apparatus 509 and installed, or installed from the storage apparatus 508, or installed from the ROM 602. When the computer program is executed by the processing apparatus 601, the functions defined in the method of the embodiments of the present disclosure are executed.

It needs to be noted that the computer-readable medium described above in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination of them. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries thereon a computer-readable program code. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable storage medium may send, propagate or transmit a program used by or in combination with an instruction execution system, apparatus or device. The program code included on the computer-readable medium may be transmitted by using any suitable medium, including but not limited to an electric wire, a fiber-optic cable, radio frequency (RF) and the like, or any appropriate combination thereof.

In some implementations, a client and a server may communicate by means of any network protocol currently known or to be developed in future such as HyperText Transfer Protocol (HTTP), and may achieve communication and interconnection with digital data (e.g., a communication network) in any form or of any medium. Examples of the communication network include a local area network (LAN), a wide area network (WAN), an Internet work (e.g., the Internet), a peer-to-peer network (e.g., ad hoc peer-to-peer network), and any network currently known or to be developed in future.

The above-mentioned computer-readable medium may be included in the electronic device described above, or it can also exist separately without being assembled into the electronic device.

The above-mentioned computer readable medium may carry one or more programs which, when executed by the electronic device, cause the electronic device to:

obtain three-dimensional coordinates and a normal direction of a fragment of a three-dimensional grid;

determine sampling coordinates based on the three-dimensional coordinates and the normal direction of the fragment;

perform a sampling on a preset texture image based on sampling coordinates; and map an image obtained by the sampling to the fragment based on an association relationship between the sampling coordinates and the fragment.

A computer program code for performing the operations in the present disclosure may be written in one or more programming languages or a combination thereof. The programming languages include but are not limited to object oriented programming languages, such as Java, Smalltalk, and C++, and conventional procedural programming languages, such as C or similar programming languages. The program code can be executed fully on a user's computer, executed partially on a user's computer, executed as an independent software package, executed partially on a user's computer and partially on a remote computer, or executed fully on a remote computer or a server. In a circumstance in which a remote computer is involved, the remote computer may be connected to a user computer via any type of network, including a local area network (LAN) or a wide area network (WAN), or may be connected to an external computer (for example, connected via the Internet by using an Internet service provider).

The flowcharts and block diagrams in the accompanying drawings illustrate system architectures, functions and operations that may be implemented by the system, method and computer program product according to the embodiments of the present disclosure. In this regard, each block in the flowcharts or block diagrams may represent a module, a program segment or a part of code, and the module, the program segment or the part of code includes one or more executable instructions for implementing specified logic functions. It should also be noted that in some alternative implementations, functions marked in the blocks may also take place in an order different from the order designated in the accompanying drawings. For example, two consecutive blocks can actually be executed substantially in parallel, and they may sometimes be executed in a reverse order, which depends on involved functions. It should also be noted that each block in the flowcharts and/or block diagrams and combinations of the blocks in the flowcharts and/or block diagrams may be implemented by a dedicated hardware-based system for executing specified functions or operations, or may be implemented by a combination of dedicated hardware and computer instructions.

Related units described in the embodiments of the present disclosure may be implemented by software, or may be implemented by hardware. The name of a unit does not constitute a limitation on the unit itself.

The functions described above herein may be performed at least in part by one or more hardware logic components. For example, exemplary types of hardware logic components that can be used without limitations include a field programmable gate array (FPGA), an application specific integrated circuit (ASIC), an application specific standard product (ASSP), a system on chip (SOC), a complex programmable logic device (CPLD), and the like.

In the context of the present disclosure, a machine-readable medium may be a tangible medium that may include or store a program for use by or in combination with an instruction execution system, apparatus or device. The machine-readable medium may be a machine-readable signal medium or a machine-readable storage medium. The machine-readable medium may include but be not limited to an electronic, magnetic, optical, electromagnetic, infrared, or semiconductor system, apparatus or device, or any appropriate combination thereof. More specific examples of the machine-readable storage medium may include an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination thereof.

An embodiment of the present disclosure further provides a computer-readable storage medium. A computer program is stored in the storage medium and may, when executed by a processor, cause implementing the method in any of the embodiments shown in FIG. 1 to FIG. 4 described above, and the implementation manner and the beneficial effects are similar, which will not be repeated here.

It should be noted that, herein, relational terms such as “first” and “second” are only used to distinguish one entity or operation from another entity or operation, and do not necessarily require or imply any actual relationship or order between these entities or operations. Moreover, the terms “including”, “includes”, or any other variation thereof are intended to encompass non-exclusive inclusion, such that a process, method, item, or device that includes a series of elements not only includes those elements, but also other elements that are not explicitly listed, or also include elements inherent in such a process, method, item, or device. Without further limitations, the elements limited by the statement “including one . . . ” do not exclude the existence of other identical elements in the process, method, item, or equipment that includes the said elements.

The above are only specific implementations of this disclosure, which enable those skilled in the art to understand or implement this disclosure. The various modifications to these embodiments will be apparent to those skilled in the art, and the general principles defined herein can be implemented in other embodiments without departing from the spirit or scope of the present disclosure. Therefore, this disclosure will not be limited to the embodiments described herein, but rather to the widest scope consistent with the principles and novel features disclosed herein.

What is claimed is:

1. A texture mapping method, comprising:

obtaining a scene image shot by a shooting device;

performing reconstruction based on the scene image to obtain corresponding three-dimensional reconstruction data;

obtaining three-dimensional coordinates and a normal direction of a fragment of a three-dimensional grid based on the three-dimensional reconstruction data;

determining sampling coordinates based on the three-dimensional coordinates and the normal direction of the fragment;

performing a sampling on a texture image based on the sampling coordinates; and mapping an image obtained by the sampling to the fragment based on an association relationship between the sampling coordinates and the fragment.

2. The method according to claim 1, wherein the determining sampling coordinates based on the three-dimensional coordinates and the normal direction of the fragment comprises:

determining, based on the three-dimensional coordinates and the normal direction of the fragment, distance relationships between a normal of the fragment and three coordinate axes of a three-dimensional coordinate system; and when a distance between the normal and a first coordinate axis of the three coordinate axes is the shortest, the sampling coordinates are determined based on components of the three-dimensional coordinates on a second coordinate axis and a third coordinate axis of the three coordinate axes.

3. The method according to claim 2, wherein the determining, based on the three-dimensional coordinates and the normal direction of the fragment, distance relationships between a normal of the fragment and three coordinate axes of a three-dimensional coordinate system comprises:

normalizing a length of the normal of the fragment to obtain a first normal;

determining components of the first normal on the three coordinate axes based on the three-dimensional coordinates and the normal direction of the fragment; and determining distance relationships between the first normal and the three coordinate axes based on the components of the first normal on the three coordinate axes, and wherein distances of the first normal from the coordinate axes are inversely proportional to the components of the first normal on the coordinate axes.

4. The method according to claim 2, further comprising:

when distances of the normal from the first coordinate axis and the second coordinate axis are the shortest, the sampling coordinates are determined based on the components of the three-dimensional coordinates on the second coordinate axis and the third coordinate axis or components of the three-dimensional coordinates on the first coordinate axis and the third coordinate axis.

5. The method according to claim 1, wherein the obtaining three-dimensional coordinates and a normal direction of a fragment of a three-dimensional grid based on the three-dimensional reconstruction data comprises:

extracting vertex three-dimensional coordinates and a vertex normal direction of the three-dimensional grid from the three-dimensional reconstruction data;

performing differential processing on the three-dimensional grid to obtain a fragment of the three-dimensional grid and an offset of the fragment relative to a vertex of the three-dimensional grid; and determining the three-dimensional coordinates and the normal direction of the fragment based on the offset as well as the vertex three-dimensional coordinates and the vertex normal directions of the three-dimensional grid.

6. A computer program product, comprising a computer program carried on a non-transitory computer-readable storage medium, wherein the computer program comprises a program code for implementing the texture mapping method according to claim 1.

7. An electronic device, comprising:

a memory and a processor, wherein a computer program is stored in the memory, and, wherein the computer program, when executed by the processor, cause the processor to:

obtain a scene image shot by a shooting device;

perform reconstruction based on the scene image to obtain corresponding three-dimensional reconstruction data;

obtain three-dimensional coordinates and a normal direction of a fragment of a three-dimensional grid based on the three-dimensional reconstruction data;

determine sampling coordinates based on the three-dimensional coordinates and the normal direction of the fragment;

perform a sampling on a texture image based on the sampling coordinates; and map an image obtained by the sampling to the fragment based on an association relationship between the sampling coordinates and the fragment.

8. The electronic device according to claim 7, wherein the determining sampling coordinates based on the three-dimensional coordinates and the normal direction of the fragment comprises:

determining, based on the three-dimensional coordinates and the normal direction of the fragment, distance relationships between a normal of the fragment and three coordinate axes of a three-dimensional coordinate system; and when a distance between the normal and a first coordinate axis of the three coordinate axes is the shortest, the sampling coordinates are determined based on components of the three-dimensional coordinates on a second coordinate axis and a third coordinate axis of the three coordinate axes.

9. The electronic device according to claim 8, wherein the determining, based on the three-dimensional coordinates and the normal direction of the fragment, distance relationships between a normal of the fragment and three coordinate axes of a three-dimensional coordinate system comprises:

normalizing a length of the normal of the fragment to obtain a first normal;

determining components of the first normal on the three coordinate axes based on the three-dimensional coordinates and the normal direction of the fragment; and determining distance relationships between the first normal and the three coordinate axes based on the components of the first normal on the three coordinate axes, and wherein distances of the first normal from the coordinate axes are inversely proportional to the components of the first normal on the coordinate axes.

10. The electronic device according to claim 8, wherein when distances of the normal from the first coordinate axis and the second coordinate axis are the shortest, the sampling coordinates are determined based on the components of the three-dimensional coordinates on the second coordinate axis and the third coordinate axis or components of the three-dimensional coordinates on the first coordinate axis and the third coordinate axis.

11. The electronic device according to claim 7, wherein the obtaining three-dimensional coordinates and a normal direction of a fragment of a three-dimensional grid based on the three-dimensional reconstruction data comprises:

extracting vertex three-dimensional coordinates and a vertex normal direction of the three-dimensional grid from the three-dimensional reconstruction data;

performing differential processing on the three-dimensional grid to obtain a fragment of the three-dimensional grid and an offset of the fragment relative to a vertex of the three-dimensional grid; and determining the three-dimensional coordinates and the normal direction of the fragment based on the offset as well as the vertex three-dimensional coordinates and the vertex normal directions of the three-dimensional grid.

12. A non-transitory computer-readable storage medium, wherein a computer program is stored in the storage medium, wherein the computer program, when executed by a processor, cause the processor to:

obtain a scene image shot by a shooting device;

perform reconstruction based on the scene image to obtain corresponding three-dimensional reconstruction data;

obtain three-dimensional coordinates and a normal direction of a fragment of a three-dimensional grid based on the three-dimensional reconstruction data;

determine sampling coordinates based on the three-dimensional coordinates and the normal direction of the fragment;

perform a sampling on a texture image based on the sampling coordinates; and map an image obtained by the sampling to the fragment based on an association relationship between the sampling coordinates and the fragment.

13. The non-transitory computer-readable storage medium according to claim 12, wherein the determining sampling coordinates based on the three-dimensional coordinates and the normal direction of the fragment comprises:

determining, based on the three-dimensional coordinates and the normal direction of the fragment, distance relationships between a normal of the fragment and three coordinate axes of a three-dimensional coordinate system; and when a distance between the normal and a first coordinate axis of the three coordinate axes is the shortest, the sampling coordinates are determined based on components of the three-dimensional coordinates on a second coordinate axis and a third coordinate axis of the three coordinate axes.

14. The non-transitory computer-readable storage medium according to claim 13, wherein the determining, based on the three-dimensional coordinates and the normal direction of the fragment, distance relationships between a normal of the fragment and three coordinate axes of a three-dimensional coordinate system comprises:

normalizing a length of the normal of the fragment to obtain a first normal;

determining components of the first normal on the three coordinate axes based on the three-dimensional coordinates and the normal direction of the fragment; and determining distance relationships between the first normal and the three coordinate axes based on the components of the first normal on the three coordinate axes, and wherein distances of the first normal from the coordinate axes are inversely proportional to the components of the first normal on the coordinate axes.

15. The non-transitory computer-readable storage medium according to claim 13, wherein when distances of the normal from the first coordinate axis and the second coordinate axis are the shortest, the sampling coordinates are determined based on the components of the three-dimensional coordinates on the second coordinate axis and the third coordinate axis or components of the three-dimensional coordinates on the first coordinate axis and the third coordinate axis.

16. The non-transitory computer-readable storage medium according to claim 12, wherein the obtaining three-dimensional coordinates and a normal direction of a fragment of a three-dimensional grid based on the three-dimensional reconstruction data comprises:

extracting vertex three-dimensional coordinates and a vertex normal direction of the three-dimensional grid from the three-dimensional reconstruction data;

performing differential processing on the three-dimensional grid to obtain a fragment of the three-dimensional grid and an offset of the fragment relative to a vertex of the three-dimensional grid; and determining the three-dimensional coordinates and the normal direction of the fragment based on the offset as well as the vertex three-dimensional coordinates and the vertex normal directions of the three-dimensional grid.

* * * * *